United States Patent [19]
Yazaki et al.

[11] Patent Number: 4,493,867
[45] Date of Patent: Jan. 15, 1985

[54] STRETCH FILM FOR WRAPPING AND A RESIN COMPOSITION THEREFOR

[75] Inventors: Takao Yazaki; Masataka Noro, both of Mie, Japan

[73] Assignee: Mitsubushi Petrochemical Co., Ltd., Tokyo, Japan

[21] Appl. No.: 358,731

[22] Filed: Mar. 16, 1982

Related U.S. Application Data

[63] Continuation of Ser. No. 143,260, Apr. 24, 1980, abandoned.

[30] Foreign Application Priority Data

Apr. 24, 1979 [JP] Japan .................................. 54-49801

[51] Int. Cl.$^3$ ....................... B32B 3/30; B32B 27/06
[52] U.S. Cl. .................................. 428/161; 428/172; 428/179; 428/220; 428/332; 428/521; 428/522; 524/310
[58] Field of Search ............... 428/179, 141, 220, 161, 428/522, 521, 332; 524/310, 312, 313, 317

[56] References Cited
U.S. PATENT DOCUMENTS 4,066,811  1/1978  Naito et al. ......................... 428/220
4,168,354  9/1979  Watts .................................. 524/312

Primary Examiner—Paul J. Thibodeau
Attorney, Agent, or Firm—Sughrue, Mion, Zinn, Macpeak, and Seas

[57] ABSTRACT

The stretch film useful for wrapping is described which comprises a resin composition composed of:
(1) from about 90 to 99.6 wt % of a resin A selected from the group consisting of ethylene-vinyl acetate copolymer resin containing 5 to 25 wt % vinyl acetate and polybutadiene resin;
(2) from about 0.2 to 5 wt % of a fatty acid ester B selected from the group consisting of sorbitan oleate and sorbitan laurate; and
(3) from about 0.2 to 5 wt % of a fatty acid ester C selected from the group consisting of monoglycerin oleate, polyglycerin oleate, glyceryl triricinoleate, and glyceryl aceryl ricinoleate, with the amount of said component B not exceeding the amount of said component C.

13 Claims, 5 Drawing Figures

STRETCH FILM FOR WRAPPING AND A RESIN COMPOSITION THEREFOR

CROSS REFERENCE TO RELATED APPLICATIONS

This application is a continuation of Ser. No. 143,260, filed Apr. 24, 1980, now abandoned.

BACKGROUND OF THE INVENTION

1. Field of the Invention

This invention relates to a stretch film comprising a resin composition prepared by blending an ethylenevinyl acetate copolymer resin and/or polybutadiene resin with specific additives. This film is particularly useful for wrapping fresh foods.

2. Description of the Prior Art

In recent years, the demand for improved films for wrapping fresh foods such as meat, fish, vegetables, fruits, etc., has increased with the expansion in the number of supermarkets using such wrapping films. Most of conventional stretch films for wrapping contain plasticized PVC (polyvinyl chloride) as a major component. These PVC films are often used for wrapping foods and, in many cases, they are applied directly to foods (in many cases being used to wrap cooked foods to be eaten directly from the package). The adverse influences of such use of PVC films (e.g., migration of residual monomer into the food) have been widely publicized. Also, the problem of generating hydrogen chloride gas upon incineration of waste PVC film is well known. Therefore, the use of PVC inherently involves difficult problems.

As a consequence of the foregoing problems, investigations have been made to develop stretch films capable of taking the place of aforesaid plasticized PVC film. Such films have comprised compositions containing mainly polyethylene, ethylene-vinyl acetate copolymer, polybutadiene or the like in order to try to overcome the above-described problems of sanitary food and environmental pollution. However, no film has yet been obtained that can sufficiently satisfy somewhat incompatible requirements for wrapping film, i.e., it must at the same time have (1) a sliding property and (2) a self adhesion property. More particularly, one requirement for wrapping film is to have a high self adhesion property necessary for superposing the film during or at the end of a wrapping step; another requirement that the film must possess is a smooth sliding property against rolls of a wrapping machine or against articles to be wrapped. It is technically very difficult to satisfy these two requirements at the same time. Poor self adhesion and poor sliding properties of aforesaid stretch films such as polyethylene film, ethylene-vinyl acetate copolymer film or polybutadiene film have rendered them less popular than PVC films, because these properties render them less suitable for wrapping machines than the plasticized PVC film.

In addition to the above-described two requirements, there are various other interrelated requirements such as: (3) that the range of suitable heat-sealing temperature be wide; (4) that the film be flexible and tough; (5) that the film be transparent, glossy, and fog-resistant.

SUMMARY OF THE INVENTION

As a result of various investigations to solve the above-described problems, it has now been discovered that the incompatible requirements for a stretch film, of simultaneously having a sliding property and a self adhesion property, can be obtained by forming a special minute physical structure on the surface of the film, and that this surface structure can be formed by adding a plurality of certain additives having particular physical properties in certain amounts.

The stretch film of the present invention comprises a resin composition composed of:

(1) from about 90 to 99.6 wt% of a resin A selected from the group consisting of ethylene-vinyl acetate copolymer resin containing 5 to 25 wt% vinyl acetate and polybutadiene resin;

(2) from about 0.2 to 5 wt% of a fatty acid ester B selected from the group consisting of sorbitan oleate and sorbitan laurate; and (3) from about 0.2 to 5 wt% of a fatty acid ester C selected from the group consisting of monoglycerin oleate, polyglycerin oleate, glyceryl triricinoleate, and glyceryl acetyl ricinoleate, with the amount of said component B not exceeding the amount of said component C.

Stretch films according to the present invention are particularly useful for wrapping purposes.

DETAILED DESCRIPTION OF THE INVENTION

If only the self adhesion property of a film was improved, the sliding property, e.g., against a wrapping machine and articles to be wrapped (for example, eggplants, cucumbers, etc.) would become so poor that problems such as breakage of the film, deformation of tray, or non-smooth mounting of the film on a wrapping machine would occur. On the other hand, if only the sliding property was improved, this would result in poor stretchability upon wrapping, and, because of the poor self adhesion property, would further result in shrinkage of the film, which leads to loose wrappings. In addition, the adhesion of labels would be so weak that severe problems such as delamination of labels would occur. Thus, such films cannot be used in a practical manner at all.

In contrast, the present invention provides a stretch film comprising a particular resin composition prepared by blending a resin with a mixture of specific fatty acid esters in specific proportions. This film has a special structure, so that it shows a good sliding property against wrapping machines and articles to be wrapped, and, at the same time, shows a good self adhesion property when layers thereof are superposed one over the other. In addition, it shows good adhesion to lables, so that there is no fear of delamination, and labelling can be satisfactorily conducted using an automatical labelling machine.

Figure 1:
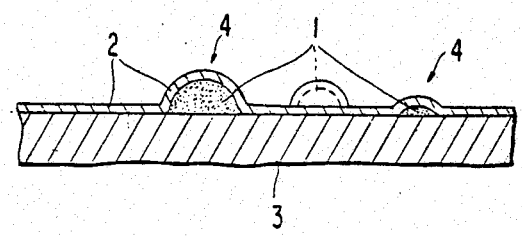
FIG. 1 is a schematic view of the surface of an embodiment of the wrapping film in accordance with the present invention.

The present invention is a stretch film comprising a resin composition composed of: (1) from about 90 to 99.6 wt% of a resin A selected from the group consisting of ethylene-vinyl acetate copolymer resin containing from about 5 to 25 wt% vinyl acetate and polybutadiene resin; (2) from about 0.2 to 5 wt% of a fatty acid ester B selected from the group consisting of sorbitan oleate and sorbitan laurate; and (3) from about 0.2 to 5 wt% of a fatty acid ester C selected from the group consisting of monoglycerin oleate such as mono-, di- or trioleate of monoglycerin, polyglycerin oleate such as mono-, di-, tri- or tetraoleate of diglycerin, glyceryl triricinoleate, and glyceryl acetyl ricinoleate, with the amount of said ingredient B not exceeding the amount of said ingredient C, and preferably the weight ratio of B/C being from about 0.8/1 to 0.2/1. The surface structure as shown in FIG. 1, which has on the film layer 3 convex protuberances 4 wherein the whole surface of binder 1 (formed of particles of component B having a diameter of from about 0.1 to 5μ) is covered by lubricant 2 (formed of component C), can be prepared by forming a film of the resin composition composed of aforesaid ingredients A, B, and C. The convex protuberances 4 substantially consist of the component B and lubricant 2 substantially consists of the component C. Further, the film layer 3 contains residual amounts of the components B and C which do not migrate to the surface. The components B and C can be combined with resin A either individually or as a mixture thereof. Components B and C are also referred to herein as additives.

Features of the present invention will be described in more detail below.

As the ethylene-vinyl acetate copolymer resin to be used as a base resin for the stretch film of the present invention, ethylene-vinyl acetate copolymer resin (hereinafter abbreviated as EVA resin) containing from about 5 to 25 wt%, preferably from about 10 to 20 wt%, vinyl acetate is useful.

If the content of vinyl acetate is less than about 5 wt%, the optical and dynamic properties necessary for a stretch film cannot be attained and, in addition, poor flexibility results. Thus, tight wrapping cannot be attained. On the other hand, if the vinyl acetate content exceeds 25 wt%, a reduction of film strength, generation of offensive smell, and increases in production costs result.

As the polybutadiene (hereinafter abbreviated as PB), 1,2-polybutadiene having a melt flow index (ASTM D1238 (1973)) of from about 1 to 8 and a density of from about 0.890 to 0.915 is preferable.

A base resin A as described above is kneaded with aforesaid additives B and C to uniformly disperse the additives therein. Furthermore, so-called master batch pellets containing these additives in high concentrations may be blended with the base resin of said ingredient A to obtain a blend for molding. The additives used in the present invention are safe with respect to contact with foods.

Methods for producing stretch film using the above-described resin composition include an inflation method and a T-die method, both of which are employable, as disclosed in, for example, U.S. Pat. Nos. 2,736,066 and 2,878,521. When film-forming was conducted using the inflation method with a blow ratio of from about 3 to 7, a wrapping film having well balanced physical properties in both the lateral and longitudinal directions was obtained, and which was strong and flexible, thus being the most practical.

The thickness of the stretch film of the present invention produced according to the above-described method is desirably in the range of from about 10 to 100μ and, for use as a pre-package film, the thickness is preferably from about 13 to 25μ. However, film comprising the resin composition of the present invention and having the special surface structure thereof can be used for a wide variety of applications in addition to pre-package use. The "pre-package" used herein means to wrap articles on a foamed polystyrene tray or a paper tray with the film of the present invention.

To obtain stable wrapping using an automatic wrapping machine, the stretch film should have a static friction coefficient (ASTM D1894 (1973)) of not more than 0.55 and an adhesive strength of not less than 200 g/2 cm$^2$ (and preferably higher, but not more than 700 g/2 cm$^2$). Although the above-described conditions are specified with respect to use of a commercially available wrapping machine (A-22 or A-44 made by Fuji Pack System Co., Ltd.) in the Examples below, the same applies to other machines.

Ordinary EVA resin or PB resin fails to show physical properties satisfying the above-described conditions.

The adhesive strength is measured in the following manner:

Two films (width of 2 cm and length of 10 cm) are superposed so as to have 1 cm overlapping portion in a length direction in a constant temperature and moisture room (20° C. and 65% RH). A load of 10 kg/cm$^2$ is applied to the overlapping portion for 2 minutes. After releasing the load, 90° peeling strength is measured using Instron type autograph tensile tester (a product of Shimazu Seisakusho, LTD) at a tensile speed of 200 mm/min.

For instance, physical properties of conventional films containing EVA resin or PB resin as a major component are shown in following Table I, together with that of PVC resin film.

TABLE I

| | Self Adhesion | Static Friction Coefficient |
|---|---|---|
| PVC (commercially available film) | 620 g/2 cm$^2$ | 0.53 |
| EVA (YUKALON EVA 41H; made by Mitsubishi Petro-Chemical Co., Ltd.) | 270 g/2 cm$^2$ | 0.90 |
| PB (JSR RB 820; made by Japan Synthetic Rubber Co., Ltd.) | <250 g/2 cm$^2$ | >0.80 |

In contrast to the above results, the present invention provides for simultaneously imparting a high self-adhesion property and a low static friction coefficient (sliding property) to EVA and PB resins.

The present invention will now be described in more detail by reference to the following non-limiting Examples.

EXAMPLE 1

A kneaded composition composed of 97 wt% of ethylene-vinyl acetate copolymer (content of vinyl acetate: 15 wt% (of EVA); YUKALON EVA 41H (trademark); made by Mitsubishi PetroChemical Co., Ltd.), 1 wt% of sorbitan oleate (SOLGEN 40 (trademark);

made by Dai-Ichi Kogyo Seiyaku Co., Ltd.), and 2 wt% of glyceryl triricinoleate (seisei Himashiyu (trademark); made by Itoh Oil Mfg. Co., Ltd.) was subjected to an inflation molding method with a blow ratio of 4.5 to obtain a stretch film of about 18μ in thickness having a self adhesion of 280 g/2 cm² and a static friction coefficient of 0.53.

Figure 2:
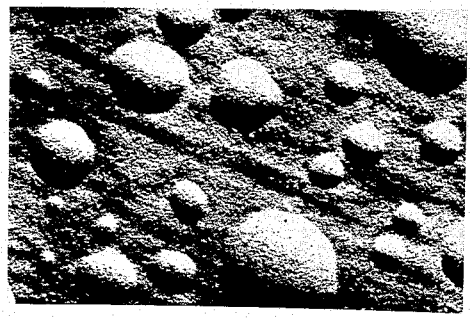
FIG. 2 is an electron microscopic photograph showing the surface of the film obtained in Example 1.

After a one-week ripening period from the time of the molding, an electron microscopic survey of the surface of the stretch film revealed a structure of innumerable, almost round convex protuberances (see FIG. 2) formed by the additives, with each convex protuberance being from about 0.1 to 2μ in diameter and from about 0.05 to 0.5μ in height.

Meat, fish, vegetables, etc., placed on expanded styrol trays were wrapped by the film using a commercially available stretch film-wrapping machine, A-22 (the same as described hereinbefore). Wrapping was conducted extremely smoothly, with the finished product having a good appearance without wrinkles or waviness. Furthermore, the film showed a good adhesion for labels (price tag, or the like), permitting the use of an automatic labeller (FSK labelling machine (trademark); made by Fuji Shiko Co., Ltd.) interlocked with the wrapping machine.

EXAMPLE 2

The same procedure as in Example 1 was followed, except using 1,2-polybutadiene (RB 820 (trademark) made by Japan Synthetic Rubber Co., Ltd.) as the base resin in place of the EVA resin.

The thus-obtained film showed usable properties similar to those of the film obtained in Example 1.

EXAMPLE 3

The same procedure as in Example 1 was followed, except that sorbitan laurate (SOLGEN 90 (trademark), a product of Dai-Ichi Kogyo Seiyaku Co., Ltd.) was used in place of sorbitan oleate to obtain a stretch film.

The stretch film thus obtained had the same surface structure as, and similar properties to, the film obtained in Example 1.

EXAMPLE 4

The same procedure as in Example 1 was followed, except that RIKEMAL φ-71D (trademark of Riken Vitamin Co., Ltd. for a mixture of monoglycerin oleates and diglycerin oleates, wherein diglycerin mono- and dioleates are the main components) was used in place of glyceryl triricinoleate to obtain a stretch film.

The stretch film thus-obtained had the same surface structure as, and similar properties to, the film obtained in Example 1. Further, due to a strong hydrophilic effect of RIKEMAL φ-71D, the stretch film had also an excellent antiblurring property.

EXAMPLE 5

The same procedure as in Example 1 was followed, except that an acetylated product of glyceryl triricinoleate (SELBONOL A-100 (trademark), a 100% acetylated product of Itoh Oil Mfg. Co., Ltd.) was used in place of glyceryl triricinoleate to obtain a stretch film.

The stretch film thus obtained had the same surface structure as, and similar properties to, the film obtained in Example 1.

EXAMPLE 6

The same procedure as in Example 1 was followed, except that a kneaded composition composed of 98 wt% of the ethylene-vinyl acetate copolymer as used in Example 1, 1 wt% of a mixture of sorbitan oleate and sorbitan laurylate (1:1 by weight) and 1 wt% of a mixture of glycerin oleate and glyceryl triricinoleate (1:1 by weight) was used to obtain a stretch film.

The stretch film thus obtained had the same surface structure as, and similar properties to, the film obtained in Example 1.

COMPARATIVE EXAMPLE 1

Figure 3:
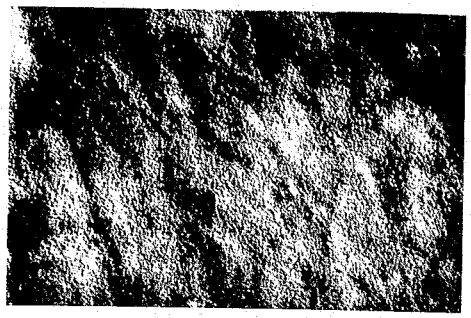
FIG. 3 is an electron microscopic photograph showing the surface of the film obtained in Comparative Example 1.

A composition prepared by kneading 97 wt% ethylene-vinyl acetate copolymer (YUKALON EVA 41H) and 3 wt% sorbitan oleic acid ester (SOLGEN 40 (trademark); made by Dai-Ichi Kogyo Seiyaku Co., Ltd.) was subjected to the same experiment as in Example 1. FIG. 3 shows the electron microscopic photograph of the surface of the thus obtained film after a one-week ripening period as in the case of Example 1.

This film had a poor sliding property with respect to the wrapping machine, tray, and articles to be wrapped; thus, stable wrapping could not be attained.

COMPARATIVE EXAMPLE 2

Figure 4:
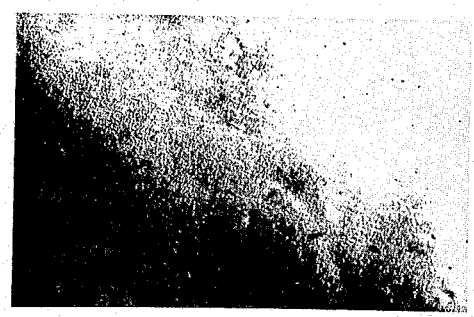
FIG. 4 is an electron microscopic photograph showing the surface of the film obtained in Comparative Example 2.

The same procedure as in Comparative Example 1 was followed, except for using 3 wt% glyceryl triricinoleate (purified castor oil) in place of sorbitan oleic acid ester. FIG. 4 shows an electron microscopic photograph of the surface of the thus obtained film.

This film had such a poor label-adhesive property that labels were delaminated; thus, the film was not capable of being put to practical use.

COMPARATIVE EXAMPLE 3

Figure 5:
FIG. 5 is an electron microscopic photograph showing the surface of the film obtained in Comparative Example 3.

A procedure analogous to Example 1 was followed, except employing the following film-forming composition:

| | |
|---|---|
| YUKALON EVA 41H | 96 wt % |
| SOLGEN 40 | 3 wt % |
| Glyceryl triricinoleate | 1 wt % | there was obtained a wrapping film. FIG. 5 shows an electron microscopic photograph of the surface of the thus obtained film.

This film had a poor sliding property, such that a continuous wrapping procedure was difficult to conduct.

As has been described in detail above, the stretch film of the present invention, useful especially for wrapping, has a suitable sliding property against wrapping machines and articles to be wrapped and, at the same time, it has a good self adhesion property. Thus, it enables the attainment of tight and beautiful wrapping and is excellent in label-adhesive property, which is of extreme importance from a marketing point of view. In addition, since materials with high safety such as ethylene-vinyl acetate copolymer or 1,2-polybutadiene can be used, there is no fear of causing environmental pollution nor anxiety about sanitation, unlike PVC. Accordingly, the stretch film is excellent as a film for wrapping foods.

While the invention has been described in detail and with reference to specific embodiments thereof, it will be apparent to one skilled in the art that various changes and modifications can be made therein without departing from the spirit and scope thereof.

What is claimed is:

1. A stretch film comprising a resin composition composed of
   (A) a resin selected from the group consisting of (i) an ethylene-vinyl acetate copolymer resin having a vinyl acetate content of from about 5 to 25% by weight and (ii) a polybutadiene resin,
   (B) a binder, and
   (C) a lubricant, wherein the strecth film has a surface structure such that particles of binder (B) are scattered on the surface of the film layer composed of resin (A) containing residual amounts of binder (B) and lubricant (C) which do not migrate to the surface and the surface of the film layer and the entire surface of the particles of binder (B) are covered by lubricant (C) to form convex protubernances having a diameter of from 0.1 to $5\mu$ and wherein the stretch film has a static friction coefficient of not more than 0.55 and an adhesive strength of not less than 200 g/2 cm$^2$.

2. The stretch film as in claim 1, which is prepared by an inflation method with a blow ratio of from about 3 to 7.

3. The stretch film as in claim 1, which has a thickness of from about 10 to $100\mu$.

4. The stretch film as in claim 1, as a pre-package film which has a thickness of from about 13 to $25\mu$.

5. The stretch film as in claim 1, wherein each convex protuberance has a height of from about 0.05 to $0.5\mu$.

6. The stretch film as in claim 1, wherein the convex protuberances are substantially spherical convex protuberances.

7. The stretch film as in claim 1, wherein the polybutadiene is 1,2-polybutadiene.

8. The stretch film as in claim 1, wherein the binder is a fatty acid ester selected from the group consisting of sorbitan oleate and sorbitan laurate.

9. The stretch film as in claim 1, wherein the lubricant is a fatty acid ester selected from the group consisting of monoglycerin oleate, polyglycerin oleate, glyceryl triricinoleate and glyceryl acetyl ricinoleate.

10. The stretch film as in claim 1, which comprises from 90 to 99.6% of resin (A), from about 0.2 to 5 wt% of binder (B) and from about 0.2 to 5 wt% of lubricant (C), with the amount of binder (B) not exceeding the amount of lubricant (C).

11. The stretch film as in claim 10, wherein the weight ratio of (B):(C) is from about 0.8:1 to 0.2:1.

12. The stretch film as in claim 7, wherein the 1,2-polybutadiene has a melt flow index of from about 1 to 8 and a density of from about 0.890 g/cm$^3$ to 0.915 g/cm$^2$.

13. The stretch film as in claim 1, wherein the vinyl acetate content is from about 10 to 20 wt%.

* * * * *